Sept. 5, 1950 F. W. SEYBOLD 2,521,486
ELECTRIC CLUTCH AND BRAKE MECHANISM
Filed July 22, 1947 3 Sheets-Sheet 1

INVENTOR.
FREDERICK W. SEYBOLD
BY
ATTORNEYS

INVENTOR.
FREDERICK W. SEYBOLD
BY
ATTORNEYS

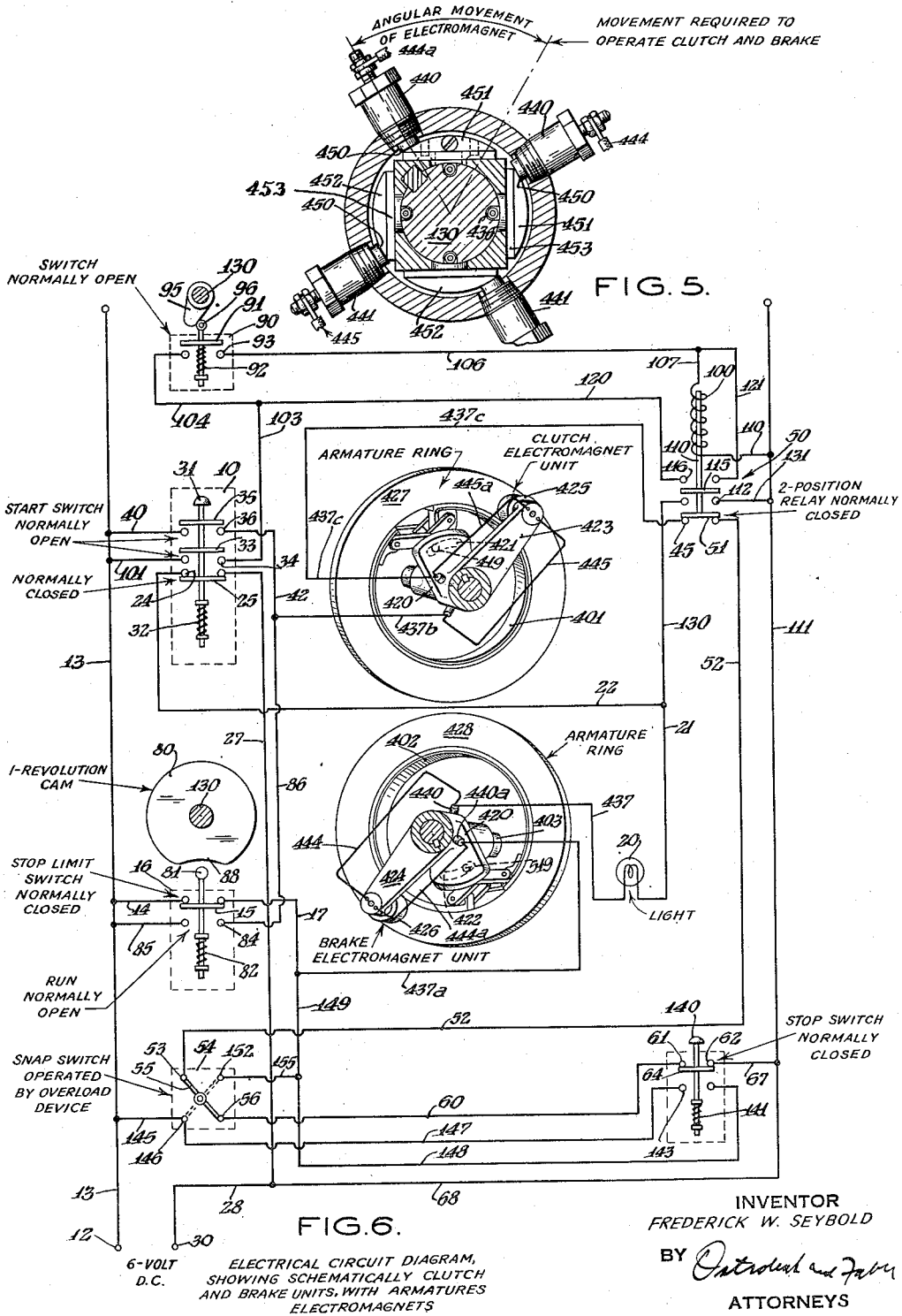

Patented Sept. 5, 1950

2,521,486

UNITED STATES PATENT OFFICE 2,521,486

ELECTRIC CLUTCH AND BRAKE MECHANISM

Frederick W. Seybold, Westfield, N. J., assignor to E. P. Lawson Co., Inc., New York, N. Y., a corporation Application July 22, 1947, Serial No. 762,684

14 Claims. (Cl. 192—17)

My present invention relates to cutting knives particularly of the type described in my application Serial No. 673,289, filed May 31, 1946, and more particularly to a novel drive mechanism and driving gauging mechanism therefor.

Heretofore and for the most part, in cutting knife machines of the guillotine type, the drive shaft which was connected to the knife and the clamp mechanism through the various elements more specifically shown in the aforesaid application was driven from a constantly rotating pulley which in turn was connected by a clutch to the drive shaft to produce one revolution of the knife driving shaft in order to produce one cycle of the cutting mechanism.

The clutch engaging mechanism and brake mechanism for stopping the drive shaft at the particular predetermined point at the beginning of the cycle have heretofore included primarily mechanical and mechanically operated driving and driven members, and mechanical and mechanically operated braking members.

A primary object of my invention is the provision of novel electrically operated clutch and braking members in connection with the driving shaft of a cutting knife of the type disclosed in my aforesaid application.

Essentially, my driving element comprises a pulley rotatably mounted on suitable bearings around the drive shaft but not keyed thereto so that the pulley may rotate independently around the drive shaft.

A clutch band is provided within a circular recess in the pulley, the said clutch band being connected to the drive shaft and being rotatable therewith. Toggle mechanism is provided for expanding the clutch band, and a magnet is provided carried by a cam adjacent the clutch band for extending the toggle mechanism in order to expand the clutch band and cause the clutch band to be driven into close frictional engagement with the recess in the pulley in which it operates in order to connect the pulley with the drive shaft.

De-energization of the electrically operated magnet permits the toggle to return to released toggle formation and thereby permits the clutch band to collapse once more to disconnect the pulley from the drive shaft.

The mechanism for operating the clutch magnet is interrelated electrically and by mechanical switching means with a similar magnet cooperating with a stationary brake drum concentric with the shaft.

An additional brake band also carried by the drive shaft revolves in a recess in the brake drum and a brake magnet is provided which will extend the toggles of the braking mechanism for expanding the brake band of the braking mechanism into the brake drum in order to frictionally interconnect the drive shaft with the stationary brake drum and thereby halt the drive shaft.

The mechanism is so inter-related that the brake magnet is energized whenever the clutch magnet is de-energized and the clutch magnet is energized whenever the brake magnet is de-energized.

Thus, another object of my invention is the provision of novel electromagnetic means for simultaneously operating clutch and brake mechanisms for a single drive shaft in such manner that a driving connection is established through the clutch mechanism whenever the brake mechanism is released, and the braking mechanism is energized to stop the drive shaft whenever the clutch mechanism is released.

Other objects of my invention include the provision of novel safety mechanism and novel stop mechanism, each of which is designed to de-energize the clutch and energize the brake in order to halt the cutting knife at any point in its cycle where necessary in accordance with the requirements of safety, in which case the halting operation will be automatic or in accordance with phenomena observed by the operator, in which case the operator need merely press an auxiliary button in order to halt the mechanism.

The foregoing and many other objects of my invention will become apparent in the following description and drawings in which:

Figure 5 is a cross-sectional view taken on line 5—5 of Figure 2 looking in the direction of the arrows.

Figure 6 is a schematic diagrammatic representation of the circuit diagram and operating parts for my mechanism.

Figure 1:
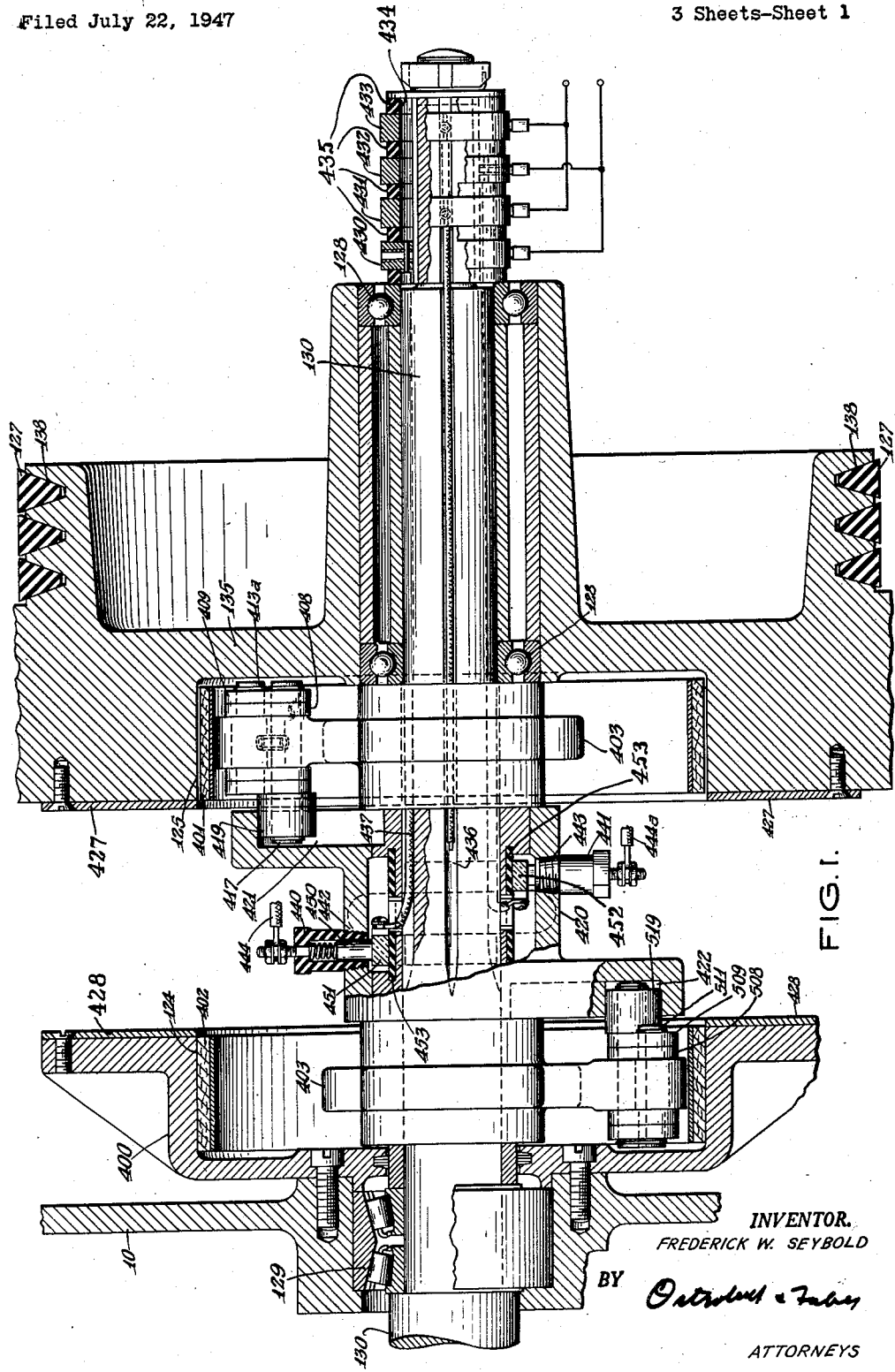
Figure 1 is a side view in cross-section through the drive mechanism for a cutting knife showing my novel clutch and brake arrangement.

Before referring to the figures, it should be pointed out that the entire cutting knife of which my novel electromagnet clutch and brake mechanism is to form a part is shown in my aforementioned application Serial No. 673,289.

The electromagnet clutch and brake of my present invention shown in Figures 1 to 6 is designed to be substituted for the mechanically operated clutch and brake mechanism of the cutting knife apparatus shown in the aforesaid application.

Accordingly, the details of the cutting knife apparatus of the aforesaid application are not repeated here but the clutch and brake mechanism which cooperates with shaft 130 which corresponds exactly to the similarly numbered shaft 130 of the aforesaid application are shown herein.

Referring now to the figures, the drive shaft 130 is mounted on bearings 129 in the frame 10 of the paper cutting machine; the outer race of the bearing 129 is held in position by the brake drum 400. The drive shaft projects to the right beyond the bearing 129 and at its outer extremity fly-wheel 135 is mounted on ball bearings 128. This fly-wheel 135 is recessed concentrically at 125 to receive the friction band 401 of the driving clutch hereinafter described. Fly wheel 135 is a pulley having peripheral grooves 138 to receive driving belts 127 which drive the fly-wheel 135. The clutch elements including friction band 401 connect the fly-wheel 135 to shaft 130 for driving shaft 130 and disconnect it when the shaft is to stop. Braking elements including brake drum 400 then stop the shaft 130 while fly-wheel 135 continues to rotate.

Figure 4:
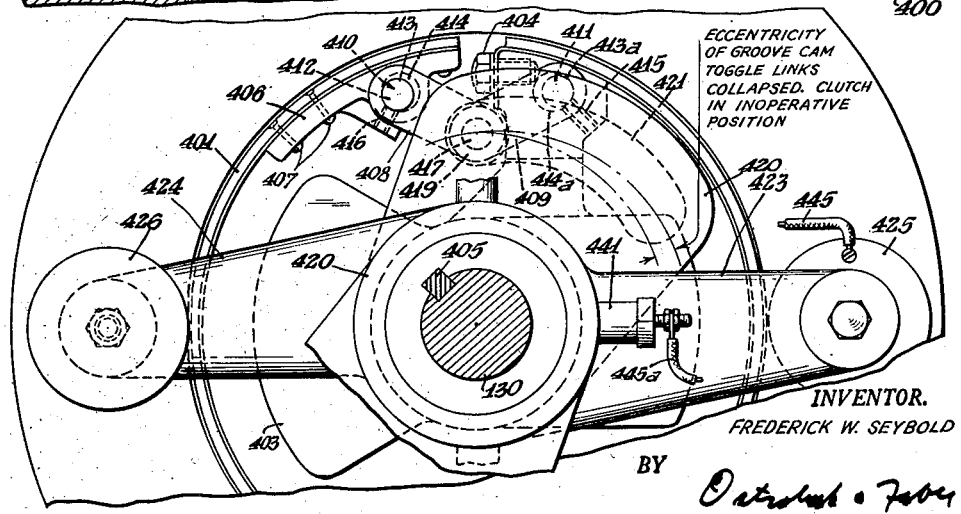
Figure 4 is a cross-sectional view partly in elevation taken from line 4—4 of Figure 2 looking in the direction of the arrows.

The brake drum 400 is recessed at 124 in a manner similar to that of fly-wheel 135 to receive the friction band brake 402. The clutch friction band 401 has one end of it anchored to the hub 403 by means of the cap screw 404 (Figure 4). The hub 403 is keyed to the drive shaft 130 by means of the key 405. The other end of the clutch friction band 401 has a clevis 406 fastened to it by means of rivets 407.

Toggle links 408 and 409 join the clevis 406 and the hub 403 by means of eccentric pin 410 on clevis 406 and eccentric pin 411 on the hub extension 403. The eccentric pin 410 comprises a main body 412 received in and completely filling the bore 413. The ends of the pin 410 on each side comprise eccentric extensions 414, 414. Similarly, pin 411 has a main body filling opening 413a and extensions 414a. The purpose of these eccentric pins it to take up wear on the clutch facing. The eccentric pins 410 and 411 are secured by means of set screws 415 and 416 in their adjusted position.

The center toggle pin 417 projects beyond the toggle link and carries a roller 419. Midway between the brake drum and the fly-wheel is positioned the cam arm 420 rotatably mounted on hub 403. This cam arm is provided with two diametrically opposite cam grooves 421 and 422.

Figure 3:
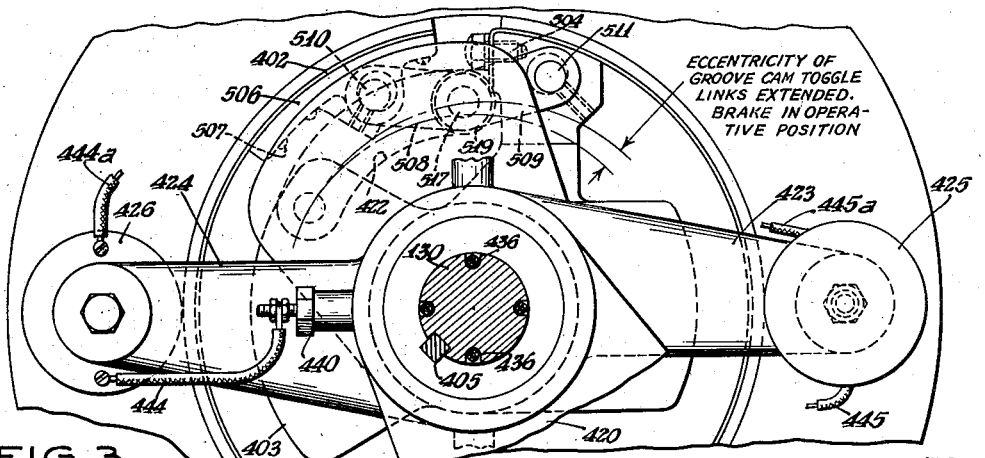
Figure 3 is a cross-sectional view partly in elevation taken from line 3—3 of Figure 2 looking in the direction of the arrows.
Figure 2:
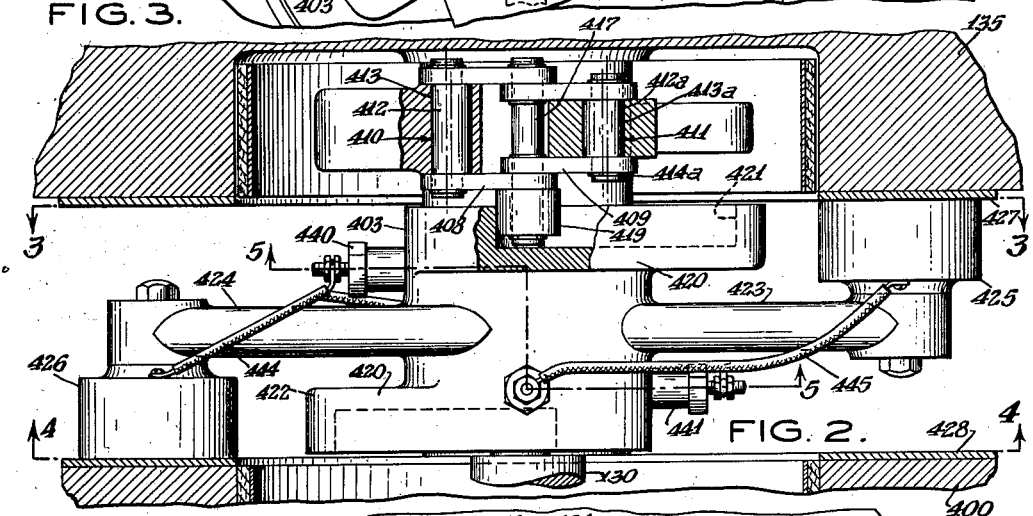
Figure 2 is a top plan view partly in cross-section of the drive mechanism of my cutting knife.

The brake friction band 402 is anchored at one end to the hub 403 by means of cap screw 504 (Figure 3). The other end of brake friction band 402 has a clevis 506 secured thereto by rivets 507. Toggle links 508 and 509 join the clevis 506 with hub 403 by means of eccentric pins 510 and 511 which have the same construction as corresponding pins 410 and 411 of the clutch mechanism of Figure 4. The center toggle pin 517 (Figure 3) projects beyond the toggle link and carries a roller 519.

Clutch roller 419 rides in cam groove 421; brake roller 519 rides in cam groove 422.

The construction of the brake is identical with that of the clutch in every respect.

The cam arm 420 also has diametrically extending arms 423 and 424 on which are mounted electromagnets 425 and 426.

These electromagnets are in frictional contact with armature plates 427 and 428, the former being fastened to the fly-wheel 135 and the latter to the brake drum 400 so that when the clutch magnet 425 is energized, it will adhere to the armature plate 427. As the fly-wheel 135 is rotating continuously in one direction, the cam arm 420 will then commence to rotate with the fly-wheel 135. The cam groove 421 is of such shape that it will force the roller 417 to straighten out the toggle links 408 and 409 and thereby expand the clutch friction band 401 so that it will tightly fit into the recess of the fly-wheel 135 and establish a driving connection to the drive shaft 130.

If the clutch magnet 425 is de-energized and the brake magnet 426 is energized, the brake magnet 426 will adhere to the armature 428. But since the armature 428 and brake drum 400 are stationary, they will begin to retard the rotation of the cam arm 420 and then the cam groove 422 will cause the roller on the toggle links of the brake friction ring 402 to expand the latter and cause a gradual reduction in speed of the drive shaft 130 and bring it to a stop.

Since the movement of the cam arm during braking was opposite to that of the rotation of the flywheel 135, the cam groove 421 will, of course, have permitted the contraction of the clutch friction band 401 and disengaged it from the recess of the fly-wheel 135. This is so because when the brake drum engaging arm 424 is held stationary, this causes in effect a reverse movement of the groove in cam 420 and with respect to the fly-wheel so that the engagement of the brake results in simultaneous release of the clutch.

Similarly, the energization of the magnet 425 which causes rotation of the clutch engaging groove to engage the clutch simultaneously causes a reverse movement of the groove or slot for brake engagement to disengage the brake.

Since these electromagnets operate on direct current, each magnet requires two lead wires for its operation. These electromagnets will operate on six volts and require approximately only one ampere of current.

On the farthest end of the drive shaft are mounted four collector rings 430, 431, 432, and 433. These collector rings are insulated from the drive shaft by a fibre sleeve 434 and from each other by fibre washers 435.

The drive shaft 130 is provided with four grooves 436 to receive four lead wires 437, one end of each of which is connected to one of the collector rings 430, 431, 432, and 433, and the other end of said lead wires connect, respectively, to terminals 440 and 441, respectively (Figures 1, 2, 3, 4 and 5).

Pigtail connections 444 and 445 can be made from the terminals 440 and 441 to the magnets.

The cam arm 420 has suitable tapped holes 442, 443 for the terminals 440 and 441, the terminals 440 being those used for the brake magnet 426 and the terminals 441 are those which are used for the clutch magnet 425.

The terminals 440 and 441 carry spring loaded brushes 450 which contact brass or copper segments 451, 452 which are also insulated from the drive shaft by a square fibre block 453. The extent of the angular movement of the cam arm is approximately 60 degrees between the run and the stop position; that is, the relative movement of the cam arm 420 is between these limits, as indicated in Figure 5. The terminals thus remain in contact with their segments 451 and 452 at all times since the segments extend over a greater arc. The leads 437 connect to the copper segments 451 and 452 as shown in Figure 1.

In Figure 6, I have shown schematically the circuit for operating my novel electric clutch and brake mechanism. The basis of the operation is a three-pole start switch 10. The circuit is such that the brake magnet 426 is normally on and the clutch magnet 425 is normally off.

Brake magnet 426 is energized from terminal 12, conductor 13, conductor 14 to bridging contact 15 of stop limit switch 16; then to conductor 17 to conductor 437a and terminal 440a on cam 420; then by conductor 444a to the brake magnet 426; the circuit for brake magnet 426 is completed through conductor 444, terminal 440, conductor 437, signal light 20, conductor 21, conductor 22 to the bottom contacts 24 of starting switch 10, then across contact bridge 25 of starting switch 10 to conductor 27, and through conductor 28 back to terminal 30.

The brake magnet 426 is thus always energized while the current for the machine is on and the machine thus can not run until the starting switch button 31 is pushed down against the compression of spring 32 which normally maintains the starting switch 10 in position to energize the brake and de-energize the clutch.

When starting switch button 31 is pushed down, the circuit for brake magnet 426 is broken by the downward movement of contact bridge 25 of switch 10. Contact bridge 33 of switch 10 then bridges contacts 34 and contact bridge 35 bridges contacts 36.

With the brake magnet 426 de-energized, the clutch magnet 425 is now energized through contact bridge 35 on contacts 36 of switch 10 over the following circuit: From terminal 12 and conductors 13 and 40 to contact bridge 35 to conductor 42 and conductors 437b and 445 to magnet 425; then through conductors 445a and 437c to contact 45 of relay 50; then over bridging contact 51 thereof to conductor 52; then to terminal 53 of safety switch 54, across the bridging contact 55 to terminal 56 of safety switch 54; then through conductor to contacts 61 of stop switch 62, across bridging contact 64 and through conductors 67, 68 and 28 back to terminal 30.

On energization of the clutch and de-energization of the brake shaft 130 begins to turn. This turns cam 80 to push down button 81 of switch 16 against the compression of spring 82 and results in opening the circuit to the brake magnet at bridging contact 15 of switch 16. Thus, the start button 31 may be relased to re-engage contact bridge 25 across contacts 24 without re-energizing brake magnet 426. The downward movement of contact bridge 15 of switch 16 closes bridge 15 across contacts 84 establishing a circuit through conductors 85 and 86 from conductor 13 to conductor 437b in parallel with the circuit for the clutch magnet established by contact bridge 35 of start switch 10 and thereby maintains the energization of the clutch magnet 425 even though start button 31 is released.

With the start button 31 released and up, the machine will come to a stop by de-energization of clutch magnet 425 and re-energization of brake magnet 426 when the recess 88 in cam 80 moves opposite button 81 of switch 16.

But it is necessary to prevent re-cycling of the machine if the operator should keep his finger on button 31 until after the cycle is completed. To prevent this, switch 90 is provided having a bridging contact 91 normally spring biased open by compression spring 92 away from contacts 93. A cam 95 on shaft 130 depresses button 96 to close bridging contact 91 across contacts 93 just as the end of the stroke is reached to halt the shaft 130 even though button 31 is pressed down by the operator.

Closing of switch 90 energizes coil 100 of relay 50 over the following path; From terminal 12 and conductor 13 to conductor 101, bridging contact 33 of the starting switch 10, conductors 103 and 104 across bridging contact 91 of switch 90, conductors 106 and 107 to coil 100 and conductors 110, 111, 68 and 28 back to terminal 30.

It will thus be obvious that if the operator has removed his finger from button 31, the circuit for coil 100 of relay 50 will be broken at contact 33 of starting switch 10 and relay 50 will not be operated by closing of switch 90.

Thus, the relay 50 operates to prevent re-cycling of the mechanism only if the operator holds button 31 down too long.

If, however, the button 31 is held down too long and relay 50 is operated by energization of coil 100, then coil 100 attracts armature 110 which carries contact 51 and opens the clutch magnet circuit at that point, disengaging the clutch.

Bridge contact 51 then closes across contacts 112, and the additional bridge contact 115 closes across contacts 116 of relay 50. Additional contact 115 acts to bypass switch 90 and hold the armature 110 up by maintaining the energization of coil 100 thereby sealing itself in closed position until the starter button 31 of switch 10 is released. The circuit for coil 100 is closed by contact 115 over the following path: Terminal 12 to conductors 13 and 101 through closed contact 33 of starter switch 10 (if it is held closed by the operator), conductors 103 and 120 to contact 115, then through conductors 121 and 107 to coil 100 of relay 50 and then through conductors 110, 111, 68 and 28 to terminal 30.

Brake magnet 426 is then prepared for energization when recess 88 of cam 80 permits contact 15 of switch 16 to engage the upper contact elements and will be energized (even if starter button 31 is still depressed) over the following path at the end of the stroke: From terminal 12, conductors 13 and 14, contact 15, conductors 17, 437a, 444a, magnet 426, conductors 444, 437, light 20, conductors 21, 130, contact 115 across contacts 112, conductors 131, 111, 68, and 28 to terminal 30.

The apparatus can not now be started again until the starter button 31 is raised to de-energize coil 100 of relay 50 and then depressed once more.

For safety in operation and to keep both hands of the operator occupied, a duplicate of switch 10 may be arranged in series therewith at two widely separated points requiring two hands to operate the two switches; or a switch spring biased open may be placed adjacent terminals 12 or 30 in conductors 13 or 28 so that two switches must be closed to start the mechanism and let it operate through the whole cycle.

During operation, it may be necessary to stop the knife at some point during its cycle. The stop switch 62 is provided for this purpose. Contact 64 thereof operated by button 140 is biased upwardly by compression spring 141 to a position where it permits the completion of the circuit for clutch magnet 425 as above pointed out and is thus necessary for engagement of the clutch.

Pressing down button 140 breaks the clutch circuit at contact 64—61 and closes a circuit for brake magnet 426 by closing contact 64 across contacts 143 over the following path: For terminal 12 and conductor 13 to conductor 145 and contact terminal 146 of switch 54 to conductor 147, contacts 143—62—61 conductors 148, 149, 437a, 444a to magnet 426, then through conductors 21, 22, contact 25 of switch 10 to conductors 27 and 28 and terminal 30.

Thus, to stop the machine at any point in a cycle, the operator need merely remove his finger from button 31 of switch 10 and press button 149 of switch 62.

Appropriate safety switch means 54 may be provided operated by any appropriate mechanical or electrical overload device. When the contact 55 of switch 54 is rotated by the mechanical or electrical overload device away from its bridging position across contacts 53—56, it breaks the circuit, above-described, for the clutch magnet 425 and closes a circuit across contacts 146 and 152 of switch 54 for brake magnet 426 from terminal 12, conductors 13 and 145, contacts 146, 55, 152, conductors 155, 149, 437a, 444a, magnet 426, conductor 444, 437, light 20, conductors 21 and 22, contacts 24 and 25, conductors 27 and 28 back to terminal 30.

In the foregoing, I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a paper cutting machine, a main drive shaft; a stationary braking drum concentric therewith; and a driving member concentric therewith and rotatable with respect thereto; a first friction band carried by said drive shaft within said brake drum; and a second friction band carried by said drive shaft within said driving member; toggle means individual to each of said friction bands for extending the same into close frictional engagement with its cooperating member; said toggle means being alternately operable to engage said driving member with its friction band to drive the shaft while at the same time disengaging the braking member from its friction band and to engage the braking member with its friction band to halt the shaft while at the same time disengaging the driving member from its friction band and electro-magnetic operating means for each of said toggles; said electro-magnetic operating means including a cam mounted on said shaft; an electro-magnet extending from said cam into juxtaposition with said brake drum and a magnet extending from said cam in juxtaposition with said driving member.

2. In a paper cutting machine, a main drive shaft; a stationary braking drum concentric therewith; and a driving member concentric therewith and rotatable with respect thereto; a first friction band carried by said drive shaft within said brake drum; and a second friction band carried by said drive shaft within said driving member; toggle means individual to each of said friction bands for extending the same into close frictional engagement with its cooperating member; said toggle means being alternately operable to engage said driving member with its friction band to drive the shaft while at the same time disengaging the braking member from its friction band and to engage the braking member with its friction band to halt the shaft while at the same time disengaging the driving member from its friction band and electro-magnetic operating means for each of said toggles; said electro-magnetic operating means including a cam mounted on said shaft; an electro-magnet extending from said cam into juxtaposition with said brake drum and a magnet extending from said cam in juxtaposition with said driving member and an armature on each of said brake drum and driving member for co-action with said cam.

3. In a paper cutting machine, a main drive shaft; a stationary braking drum concentric therewith; and a driving member concentric therewith and rotatable with respect thereto; a first friction band carried by said drive shaft within said brake drum; and a second friction band carried by said drive shaft within said driving member; toggle means individual to each of said friction bands for extending the same into close frictional engagement with its cooperating member; said toggle means being alternately operable to engage said driving member with its friction band to drive the shaft while at the same time disengaging the braking member from its friction band and to engage the braking member with its friction band to halt the shaft while at the same time disengaging the driving member from its friction band and electro-magnetic operating means for each of said toggles; said electro-magnetic operating means including a cam mounted on said shaft; an electro-magnet extending from said cam into juxtaposition with said brake drum and a magnet extending from said cam in juxtaposition with said driving member and an armature on each of said brake drum and driving member for co-action with said cam, and a connection from said cam to each of said toggle means.

4. In a paper cutting machine, a main drive shaft; a stationary braking drum concentric therewith; and a driving member concentric therewith and rotatable with respect thereto; a first friction band carried by said drive shaft within said brake drum; and a second friction band carried by said drive shaft within said driving member; toggle means individual to each of said friction bands for extending the same into close frictional engagement with its cooperating member; said toggle means being alternately operable to engage said driving member with its friction band to drive the shaft while at the same time disengaging the braking member from its friction band and to engage the braking member with its friction band to halt the shaft while at the same time disengaging the driving member from its friction band and electro-magnetic operating means for each of said toggles; said electro-magnetic operating means including a cam mounted on said shaft; an electro-magnet extending from said cam in juxtaposition with said driving member and an armature on each of said brake drum and driving member for co-action with said cam, and a connection from said cam to each of said toggle means for extending said toggle when the magnet associated therewith is energized to be attracted to and become stationary with respect to its toggle.

5. In a paper cutting machine, a main drive shaft; a stationary braking drum concentric therewith; and a driving member concentric therewith and rotatable with respect thereto; a first friction band carried by said drive shaft within said brake drum; and a second friction band carried by said drive shaft within said driving member; toggle means individual to each of said friction bands for extending the same into close frictional engagement with its cooperating member; said toggle means being alternately operable to engage said driving member with its friction band to drive the shaft while at the same time disengaging the braking member from its friction band and to engage the braking member with its friction band to halt the shaft while at the same time disengaging the driving member from its friction band and electro-magnetic operating means for each of said toggles; said electro-magnetic operating means including a cam mounted on said shaft; an electro-magnet extending from said cam into juxtaposition with said brake drum and a magnet extending from said cam in juxtaposition with said driving member and an armature on each of said brake drum and driving member for co-action with said cam, and a connection from said cam to each of said toggle means for extending said toggle when the magnet associated therewith is energized to be attracted to and become stationary with respect to its toggle; said electro-magnets being alternately energized and deenergized for starting and stopping purposes; one of said electromagnets being energized at all times during the operation of the machine.

6. In a paper cutting machine, a drive shaft; a cam mounted on said drive shaft; braking means concentric with said drive shaft; driving means concentric with said drive shaft; means for alternately connecting said driving means and said braking means to said drive shaft; said means including a pair of electro-magnets mounted on said cam; an armature on each of said braking means and driving means, one of said electro-magnets extending into juxtaposition with the armature of said braking means and the other electro-magnet extending into juxtaposition with the armature of the driving means; means operable on energization of the braking electro-magnet to connect the braking means to the shaft to halt the shaft.

7. In a paper cutting machine, a drive shaft; a cam mounted on said drive shaft; braking means concentric with said drive shaft; driving means concentric with said drive shaft; means for alternately connecting said driving means and said braking means to said drive shaft; said means including a pair of electro-magnets mounted on said cam; an armature on each of said braking means and driving means, one of said electro-magnets extending into juxtaposition with the armature of said braking means and the other electro-magnet extending into juxtaposition with the armature of the driving means; means operable on energization of the braking electro-magnet to connect the braking means to the shaft to halt the shaft; means operable on energization of the driving electro-magnet to connect the driving member to the shaft to drive the same.

8. In a paper cutting machine, a drive shaft; a cam mounted on said drive shaft; braking means concentric with said drive shaft; driving means concentric with said drive shaft; means for alternately connecting said driving means and said braking means to said drive shaft; said means including a pair of electro-magnets mounted on said cam; an armature on each of said braking means and driving means, one of said electro-magnets extending into juxtaposition with the armature of said braking means and the other electro-magnet extending into juxtaposition with the armature of the driving means; means operable on energization of the braking electro-magnet to connect the braking means to the shaft to halt the shaft; means operable on energization of the driving electro-magnet to connect the driving member to the shaft to drive the same; one of the magnets being de-energized when the other is energized; the means associated with the energized magnet being connected to the shaft; and the means associated with the de-energized magnet being disconnected from the shaft.

9. In a paper cutting machine, a drive shaft; a cam mounted on said drive shaft; braking means concentric with said drive shaft; driving means concentric with said drive shaft; means for alternately connecting said driving means and said braking means to said drive shaft; said means including a pair of electro-magnets mounted on said cam, an armature on each of said braking means and driving means, one of said electro-magnets extending into juxtaposition with the armature of said braking means and the other electro-magnet extending into juxtaposition with the armature of the driving means; energization of one magnet causing said cam to shift with respect to the shaft in one direction; and energization of the other magnet causing said cam to shift in the other direction; said alternate shifting of the cam alternately controlling the braking and driving means.

10. In a paper cutting machine, a drive shaft; a cam mounted on said drive shaft; braking means concentric with said drive shaft; driving means concentric with said drive shaft; means for alternately connecting said driving means and said braking means to said drive shaft; said means including a pair of electro-magnets mounted on said cam, an armature on each of said braking means and driving means, one of said electro-magnets extending into juxtaposition with the armature of said braking means and the other electro-magnet extending into juxtaposition with the armature of the driving means; energization of one magnet causing said cam to shift with respect to the shaft in one direction; and energization of the other magnet causing said cam to shift in the other direction; means connected to said cam and operable on the shifting of said cam to one angular position to engage the braking means with the shaft and disengage the driving means; and operable on shifting of said cam to another angular position to engage the driving means with the shaft and disengage the braking means.

11. In a paper cutting machine, a drive shaft; a cam mounted on said drive shaft; braking means concentric with said drive shaft; driving means concentric with said drive shaft; means for alternately connecting said driving means and said braking means to said drive shaft; said means including a pair of electro-magnets mounted on said cam, an armature on each of said braking means and driving means, one of said electro-magnets extending into juxtaposition with the armature of said braking means and the other electro-magnet extending into juxtaposition with the armature of the driving means; energization of one magnet causing said cam to shift with respect to the shaft in one direction; and energization of the other magnet causing said cam to shift in the other direction; means connected to said cam and operable on the shifting of said cam to one angular position to engage the braking means with the shaft and disengage the driving means; and operable on shifting of said cam to another angular position to engage the driving means with the shaft and disengage the braking means; additional means for normally maintaining said braking magnet energized and said driving magnet de-energized; control means for de-energizing said braking magnet and energizing said driving magnet; said additional means being operable on the completion of a cycle of the machine to de-energize said driving magnet and energize said braking magnet.

12. In a paper cutting machine, a drive shaft; a cam mounted on said drive shaft; braking means concentric with said drive shaft; driving means concentric with said drive shaft; means for alternately connecting said driving means and said braking means to said drive shaft; said means including a pair of electro-magnets mounted on said cam, an armature on each of said braking means and driving means, one of said electro-magnets extending into juxtaposition with the armature of said braking means and the other electro-magnet extending into juxtaposition with the armature of the driving means; energization of one magnet causing said cam to shift with respect to the shaft in one direction; and energization of the other magnet causing said cam to shift in the other direction; means connected to said cam and operable on the shifting of said cam to one angular position to engage the braking means with the shaft and disengage the driving means; and operable on shifting of said cam to another angular position to engage the driving means with the shaft and disengage the braking means; additional means for normally maintaining said braking magnet energized and said driving magnet de-energized; control means for de-energizing said braking magnet and energizing said driving magnet; said additional means being operable on the completion of a cycle of the machine to de-energize said driving magnet and energize said braking magnet; and a further control for de-energizing said driving magnet and energizing said braking magnet during the cycle.

13. In a paper cutting machine, a drive shaft; a cam mounted on said drive shaft; braking means concentric with said drive shaft; driving means concentric with said drive shaft; means for alternately connecting said driving means and said braking means to said drive shaft; said means including a pair of electro-magnets mounted on said cam, an armature on each of said braking means and driving means, one of said electro-magnets extending into juxtaposition with the armature of said braking means and the other electro-magnet extending into juxtaposition with the armature of the driving means; energization of one magnet causing said cam to shift with respect to the shaft in one direction; and energization of the other magnet causing said cam to shift in the other direction; means connected to said cam and operable on the shifting of said cam to one angular position to engage the braking means with the shaft and disengage the driving means; and operable on shifting of said cam to another angular position to engage the driving means with the shaft and disengage the braking means; additional means for normally maintaining said braking magnet energized and said driving magnet de-energized; control means for de-energizing said braking magnet and energizing said driving magnet; said additional means being operable on the completion of a cycle of the machine to de-energize said driving magnet and energize said braking magnet; and a further automatic control for disconnecting said first-mentioned control means at the end of a cycle and operable when said first-mentioned control means is connected during an entire cycle to de-energize said driving magnet and energize said braking magnet.

14. In a paper cutting machine, a drive shaft; a cam mounted on said drive shaft; braking means concentric with said drive shaft; driving means concentric with said drive shaft; means for alternately connecting said driving means and said braking means to said drive shaft; said means including a pair of electro-magnets mounted on said cam, an armature on each of said braking means and driving means; one of said electro-magnets extending into juxtaposition with the armature of said braking means and the other electro-magnet extending into juxtaposition with the armature of the driving means; energization of one magnet causing said cam to shift with respect to the shaft in one direction; and energization of the other magnet causing said cam to shift in the other direction; means connected to said cam and operable on the shifting of said cam to one angular position to engage the braking means with the shaft and disengage the driving means; and operable on shifting of said cam to another angular position to engage the driving means with the shaft and disengage the braking means; additional means for normally maintaining said braking magnet energized and said driving magnet de-energized; control means for de-energizing said braking magnet and energizing said driving magnet; said additional means being operable on the completion of a cycle of the machine to de-energize said driving magnet and energize said braking magnet; and a further safety control operable automatically during a cycle to de-energize said driving magnet and energize said braking magnet.

FREDERICK W. SEYBOLD.

REFERENCES CITED

The following references are of record in the file of this patent:

UNITED STATES PATENTS

| Number | Name | Date |
| --- | --- | --- |
| 985,699 | Pearson et al. | Feb. 28, 1911 |
| 1,028,503 | Sutherland et al. | June 24, 1912 |
| 1,045,909 | Thomas | Dec. 3, 1912 |
| 1,047,421 | Lietz | Dec. 17, 1912 |
| 2,061,787 | Warner | Nov. 24, 1936 |

FOREIGN PATENTS

| Number | Country | Date |
| --- | --- | --- |
| 29,628 | Great Britain | of 1910 |